United States Patent [19]

Ikeno

[11] Patent Number: 5,064,889
[45] Date of Patent: Nov. 12, 1991

[54] CURABLE FLUOROSILICONE COMPOSITION

[75] Inventor: Masayuki Ikeno, Gunma, Japan

[73] Assignee: Shin-Etsu Chemical Co., Ltd., Tokyo, Japan

[21] Appl. No.: 429,926

[22] Filed: Oct. 31, 1989

[30] Foreign Application Priority Data

Nov. 1, 1988 [JP] Japan .................. 63-276645

[51] Int. Cl.$^5$ .............................. C08K 5/54
[52] U.S. Cl. .................. 524/188; 524/714; 524/722; 524/731

[58] Field of Search ............... 524/188, 722, 714, 731

[56] References Cited

U.S. PATENT DOCUMENTS 4,039,503 8/1977 Itoh ........................ 524/188
4,857,564 8/1989 Maxson ..................... 524/188

Primary Examiner—Melvyn I. Marquis
Attorney, Agent, or Firm—Millen, White & Zelano

[57] ABSTRACT

Curable fluorosilicone compositions, which contain an aryl amino group-containing organopolysiloxane to enhance heat resistance in the open air.

7 Claims, No Drawings

CURABLE FLUOROSILICONE COMPOSITION

FIELD OF THE INVENTION

This invention relates to a curable fluorosilicone composition and, more particularly, to a curable fluorosilicone composition endowed with thermal resistance in the open air.

BACKGROUND OF THE INVENTION

The gel state of cured silicone rubber (which is abbreviated as silicone gel hereinafter) is excellent in electrically insulating property, stability of electric characteristics and pliability, so it is used for potting and sealing electric and electronic parts, especially coating control circuit elements, such as power transistor, IC, condenser and so on, to protect the parts against thermal and mechanical problems. However, for all the above-described characteristics, the prior art silicone gels do not cope satisfactorily with the recent trend of electronically controlling various devices installed in cars. Therefore, it has been desired to develop a silicone gel which additionally has resistance to hydrocarbon fluid and gasoline. Though the introduction of $CF_3CH_2CH_2$-group has been recommended as solvent resistance-imparting means, the silicone gel into which said group is introduced suffers from considerable deterioration in heat resistance in the open air and becomes rigid in a short time at high temperatures to lose its original characteristics. Accordingly, the above-described silicone gel is not suitable for car use. As a result of concentration of our energies on solution of the above-described problem, it has now been found that heat resistance of silicone gel can be remarkably enhanced by adding an aromatic amine-containing organopolysiloxane to a silicone gel composition, thus achieving this invention.

SUMMARY OF THE INVENTION

Therefore, an object of this invention is to provide a curable silicone rubber composition which has high heat resistance in the open air, as well as the excellent properties characteristic of silicone gels, that is, excellent electric insulation, sufficient ability to stabilize electric characteristics and high pliability.

The above-described object of this invention is attained with a curable fluorosilicone composition which contains:

(1) 100 parts by weight of an organopolysiloxane having an average compositional formula of $(CF_3CH_2CH_2)_a R^1{_b}SiO_{(4-a-b)/2}$, wherein $R^1$ represents a monovalent hydrocarbon residue containing 1 to 8 carbon atoms, at least 0.005 mol % of $R^1$ being a vinyl and/or allyl group; a represents a figure from 0.1 to 1.0 and b represents a figure from 2.5 to 1.0, provided that the sum of a+b ranges 1.8 to 3.0;

(2) an organohydrogensiloxane having on an average at least two hydrogen atoms bonded to silicon atoms in the molecule, in such an amount as to provide a ratio of 0.5 to 3 silicone-bonding hydrogens to each unsaturated group bonded to a silicon atom contained in the organopolysiloxane (1), (3) 0.01 to 10 parts by weight of at least one organopolysiloxane selected from those represented by the following general formulae:

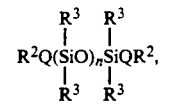

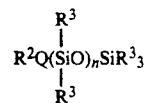

and

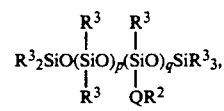

wherein $R^2$ represents a monovalent aromatic amino group; $R^3$ represents a substituted or unsubstituted monovalent hydrocarbon residue of 1-8 carbon atoms which does not contain any aliphatic unsaturated moiety; Q represents —O—, or a divalent hydrocarbon residue of 1-6 carbon atoms; n represents an integer from 0 to 500; and p represents an integer from 0 to 47 and q represents an integer from 1 to 10, provided that the sum of p+q is from 1 to 48, and (4) a catalytic amount of a catalyst selected from platinum, palladium and rhodium compounds.

DETAILED DESCRIPTION OF THE INVENTION

In the formula $(CF_3CH_2CH_2)_a R^1{_b}SiO_{(4-a-b)/2}$, which represents the above-described component (1), $R^1$ is a monovalent hydrocarbon residue of 1-8 carbon atoms, at least 0.005 mol % of which is a vinyl group and/or allyl group, a is from 0.1 to 1.0, b is from 2.5 to 1.0, and the sum of a+b is from 1.8 to 3.0. It is desirable from the standpoint of ease of synthesis that the siloxane skeleton should assume a substantially straight-chain form, though it may be a straight chain, a branched chain or a mixed form thereof. Although the vinyl or allyl group in this organopolysiloxane may be bonded to either the silicon atom within the molecular chain or the terminal silicon atom, it is preferable with respect to curing speed that such a group be bonded to the terminal silicon atom.

Suitable examples of hydrocarbon residues represented by $R^1$ include methyl group, ethyl group, propyl group, phenyl group and the like.

Specific examples of an organopolysiloxane described above include those represented by the following formulae (a-1) to (a-5). In this invention, these compounds can be used alone or as a mixture of two or more thereof.

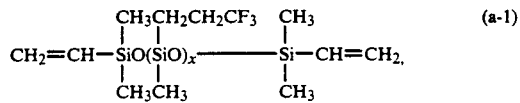

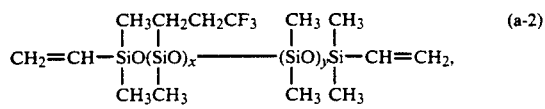

-continued

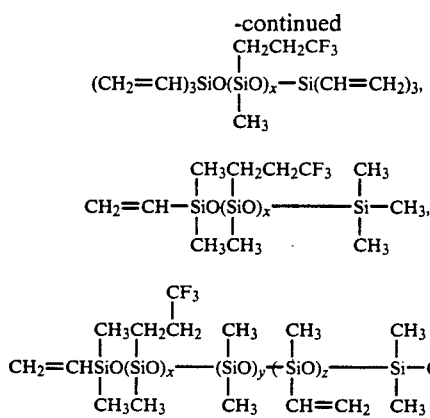

In the foregoing formulae, x, y and z are each a positive integer. It is desirable that x is from 1 to 1,000, x+y is from 2 to 1,000 and x+y+z is from 3 to 1,000.

The organohydrogensiloxane to be used in this invention, which corresponds to the above-described component (2), forms a gelled substance by reacting with the unsaturated group(s) of the organopolysiloxane (1). Therefore, the number of hydrogen atoms bonded to silicon atoms must be an average of at least two in a molecule. An amount of component (2) to be mixed corresponds to such a quantity that the number of hydrogen atoms bonded to silicon atom(s) in component (2) is 0.5 to 3, preferably 0.8 to 1.5, per one unsaturated group attached to the silicon atom in the component (1). When the number of the hydrogen atoms bonded to silicon atoms is too small, the cross-linking reaction cannot proceed to a satisfactory extent to cause flowing of the gelled matter, whereas when it is too large, there is a risk of foaming. The hydrogen atoms of the above-described kind may be bonded to either terminal or internal silicon atoms of the molecular chain. The siloxane skeleton may assume either a straight-chain or branched form. Organic groups bonded to the silicon atoms in the component (2) are groups other than unsaturated ones, and particularly preferred is a methyl group from the standpoint of ease of synthesis. In addition, it is desirable that a fluorine content in component (2) corresponds to the fluorine content in component (1), because it is desirable to render component (2) compatible with component (1). Specific examples of organohydrogensiloxanes described above include those represented by the following formulae (b-1) to (b-9).

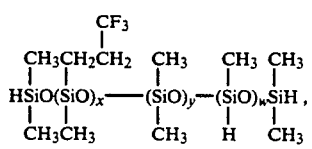

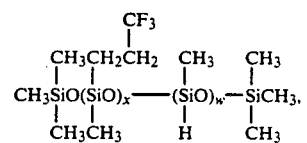

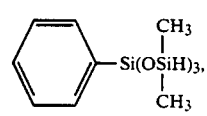

-continued

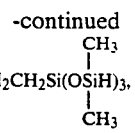

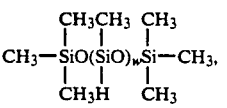

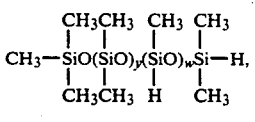

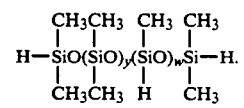

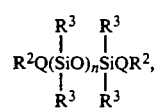

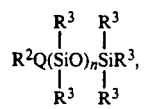

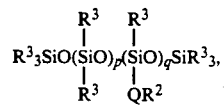

In the foregoing formulae, x and y are each a positive interger, and w is an integer of 2 or more. It is desirable that w is from 2 to 500, w+y is from 3 to 500 and w+x+y is from 4 to 500.

In this invention, these organohydrogensiloxanes can be used singly or as a mixture of two or more thereof.

Component (3) to be used in this invention, which is at least one organopolysiloxane selected from those represented by the following general formulae;

$$R^2Q(SiO)_n SiQR^2,\ \text{with }R^3\text{ substituents}$$

$$R^2Q(SiO)_n SiR^3,\ \text{with }R^3\text{ substituents}$$

and $$R^3{}_3SiO(SiO)_p(SiO)_q SiR^3{}_3,\ \text{with }R^3\text{ and }QR^2\text{ substituents}$$

can enhance the heat resistance of the present composition in the open air. $R^2$ in the foregoing formulae is a monovalent aromatic amino group, $R^3$ is a substituted or unsubstituted, monovalent hydrocarbon residue of 1 to 8 carbon atoms which does not contain an aliphatic unsaturated group, Q is oxygen or a divalent hydrocarbon residue of 1 to 6 carbon atoms, n is an integer from 0 to 500, p is an integer from 0 to 47, q is an integer from 1 to 10, and p+q is an integer from 1 to 48. More specifically, monovalent aromatic amino groups represented by $R^2$ include

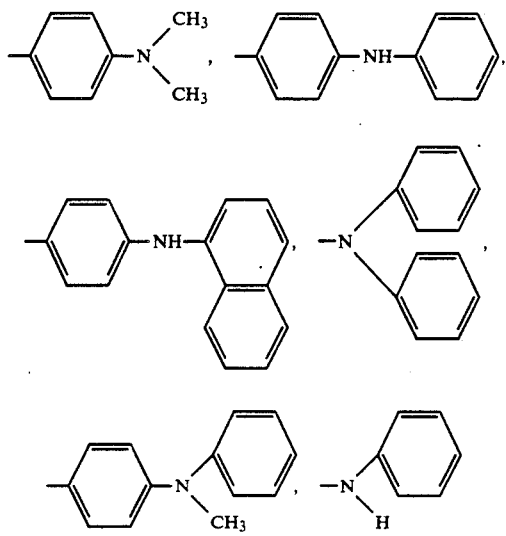

and so on. Linkage groups represented by Q include —O—, —CH$_2$CH$_2$—, —CH$_2$CH$_2$CH$_2$—, —(CH$_2$)$_6$—, and so on. Substituent groups represented by $R^3$ include methyl group, ethyl group, propyl group, phenyl group, trifluoropropyl group, and so on.

When the value of n in the above-described organopolysiloxanes is larger than 500, such organopolysiloxanes require an increased compounding amount in order to produce a heat resistance enhancing effect to a desired extent, so they become unsuitable for practical use as additives. Accordingly, it is desirable that the value of n should range from 1 to 500. As for the values p and q, it is required that p ranges from 0 to 47 and p+q ranges from 1 to 48, because when p is larger than 47 and p+q is larger than 48, in analogy with n, it becomes necessary to increase the compounding amount in order to achieve a desired extent of heat resistance enhancing effect. In addition, when q is larger than 10, the resulting organopolysiloxanes have lower solubility in the polysiloxanes as component (1). Therefore, it is required of the value that q ranges from 1 to 10.

These organopolysiloxanes containing aromatic amino groups can be prepared, e.g., by allowing aminophenols, such as those represented by the formulae,

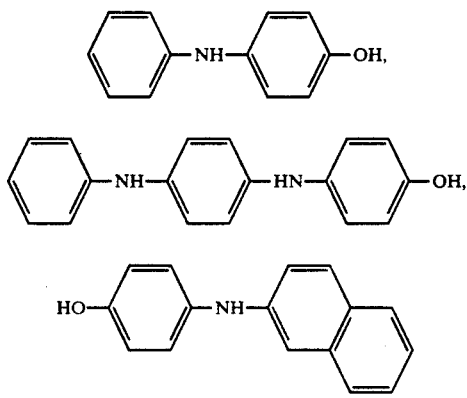

and

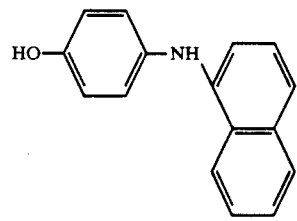

and alkylpolysiloxanes containing reactive groups, such as chlorine atom or so on, to undergo condensation reaction in toluene solvent in the presence of a hydrogen chloride capture agent, removing the thus produced chloride from the reaction system, and then heating the reaction mixture under reduced pressure to effect solvent stripping. Also, they can be obtained by reacting unsaturated group-containing amino compounds, such as those represented by the formulae,

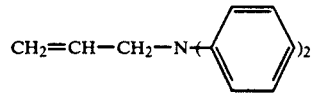

and

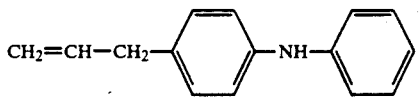

with an organohydrogensiloxane in the presence of a platinum catalyst. When these aromatic amino group-containing organopolysiloxanes are added in an amount smaller than 0.01 part by weight, they cannot fully achieve their effect, whereas additional amounts beyond 10 parts by weight are economically disadvantageous since the effect produced by the addition has already been reached. Therefore, the range of 0.01 to 10 parts by weight is desirable for the addition of aromatic amino group-containing organopolysiloxanes.

Component (4) of this invention, which is a catalyst for the addition reaction of the unsaturated groups bonded to silicon atoms in the polyorganosiloxane of component (1) with the hydrogen atoms bonded to silicon atoms in component (2), can be properly chosen from known ones. Suitable examples of such a catalyst as described above include platinum compounds such as chloroplatinic acid, an alcohol-modified solution of chloroplatinic acid, compounds produced by coordination of chloroplatinic acid to olefines or vinylsiloxanes, etc., tetrakis(triphenylphosphine) palladium, chlorotris(triphenylphosphine)rhodium, and so on. In particular, platinum compounds are favored.

In the composition of this invention, it is desirable that the amount of component (4) employed as catalyst for the addition reaction range generally from 0.1 to 100 ppm, particularly and preferably from 3 to 20 ppm, component (1). When component (4) is employed in too large an amount, not only does a great change in color caused by thermal deterioration occur, but also an increase in cost is brought about. On the other hand, when the amount employed is too small, curing inhibition tends to occur.

In addition to the above-described components (1), (2), (3) and (4), the composition of this invention can contain various kinds of arbitrary components, if desired.

For instance, hardness, mechanical strength, thermal conductivity, and electric conductivity of the cured fluorosilicone composition of this invention can be controlled by the addition of inorganic fillers, such as aerosol silica, silica aerogel, precipitated silica, ground silica, diatomaceous earth, iron oxide, zinc oxide, titanium oxide, calcium carbonate, magnesium carbonate, zinc carbonate, alumina, aluminium nitride, boron nitride, carbon black and so on. The amounts of these inorganic fillers employed is not in particular limited, and can be chosen arbitrarily provided the characteristics of the cured matter are not impaired by the addition. Further, flowability of the fluorosilicone composition and hardness of the cured matter can be controlled by the addition of other silicone oils such as dimethylpolysiloxane, etc., raw rubber, or so on in such amounts which do not impair the effects of this invention.

Furthermore, known reaction retarders may be added to the composition of this invention.

Since an aromatic amine-containing organopolysiloxane is used as a heat-resisting additive in the curable fluorosilicone composition of this invention, the cured silicone rubber can acquire enhanced heat resistance in the open air and it retains excellent characteristics inherent in silicone rubbers, including excellent electric insulation, stabilization of electric characteristics and pliability.

This invention will now be described in more detail by reference to the following examples. However, the invention should not be construed as being limited to these examples.

EXAMPLE 1

The components illustrated below were homogeneously mixed in each of the compounding ratios shown in Table 1 to prepare compositions No. 1 to No. 8. Compositions No. 1 to No. 4 were prepared in accordance with this invention, and compositions No. 5 to No. 8 were prepared for comparison thereto.

Polysiloxane I:
Polysiloxane having an average formula, $$(CH_2=CH-\underset{\underset{CH_3}{|}}{\overset{\overset{CH_3}{|}}{Si}}O)_{1.0}(\underset{\underset{CH_2CH_2CF_3}{|}}{\overset{\overset{CH_3}{|}}{Si}}O)_{35}-(\underset{\underset{CH_3}{|}}{\overset{\overset{CH_3}{|}}{Si}}O)_{13}(\underset{\underset{CH_3}{|}}{\overset{\overset{CH_3}{|}}{Si}}-CH_3)_{1.0}$$

and a viscosity of 700 cp at 25° C.

Polysiloxane II:
Polysiloxane having an average formula, $$(CH_2=CH-\underset{\underset{CH_3}{|}}{\overset{\overset{CH_3}{|}}{Si}}O)_{1.0}(\underset{\underset{CH_3}{|}}{\overset{\overset{CH_2CH_2CF_3}{|}}{Si}}O)_{50}-(\underset{\underset{CH_3}{|}}{\overset{\overset{CH_3}{|}}{Si}}-CH_3)_{1.0}$$

and a viscosity of 3,000 cp at 25° C.

Polysiloxane III:
Polyhydrogensiloxane having an average formula, $$(HSiO_{0.5})_6(SiO_2)_2(\underset{\underset{CH_3}{|}}{\overset{\overset{CH_3}{|}}{Si}}O)_5 \quad \text{with } CH_2CH_2CF_3 \text{ side chain}$$

and a viscosity of 30 cp at 25° C.

Polysiloxane IV:
Polyhydrogensiloxane having an average formula, $$HSiO(\underset{\underset{CH_3}{|}}{\overset{\overset{CH_3CH_3}{|}}{Si}}O)_4(\underset{\underset{CH_3}{|}}{\overset{\overset{CH_2CH_2CH_3}{|}}{Si}}O)_{14} \underset{\underset{CH_3}{|}}{\overset{\overset{CF_2}{|}}{Si}}H$$

and a viscosity of 80 cp at 25° C.

Polysiloxane V:
Organopolysiloxane having an average formula,

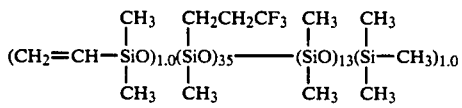

and a viscosity of 90 cp at 25° C.

Platinum-I:
2-Ethylhexanol solution of chloropratinic acid (platinum content; 2 wt %).

Each of compositions No. 1 to No. 8 was cured by heating at 150° C. for 2 hours to form a gelled matter.

The thus cured, gel-form compositions were examined for heat resistance by placing them in a 200° C. oven of circulated air heating type for 300 hours, and then their respective changing rates of penetration. The penetration was determined was measured with a ¼-scale cone. The results obtained are shown in Table 1.

TABLE 1

| Ingredients | Compositions of This Invention | | | | Compositions for Comparison | | | |
|---|---|---|---|---|---|---|---|---|
|  | No. 1 | No. 2 | No. 3 | No. 4 | No. 5 | No. 6 | No. 7 | No. 8 |
| Component (1) | | | | | | | | |
| Polysiloxane I | 100 | 100 |  |  | 100 | 100 |  |  |
| Polysiloxane II |  |  | 100 | 100 |  |  | 100 | 100 |
| Component (2) | | | | | | | | |
| Polysiloxane III | 3.4 | 3.4 |  |  | 3.4 | 3.4 |  |  |
| Polysiloxane IV |  |  | 5.0 | 5.0 |  |  | 5.0 | 5.0 |
| Component (3) | | | | | | | | |
| Polysiloxane V | 0.1 | 0.8 | 0.1 | 0.8 | — | — | — | — |
| Component (4) | | | | | | | | |
| Platinum-1 | 0.02 | 0.02 | 0.02 | 0.02 | 0.02 | 0.02 | 0.02 | 0.02 |
| Antioxidant* | — | — | — | — | — | 1.0 | — | 1.0 |
| SiH/SiCH=CH$_2$ Ratio (by mole) | 1.1 | 1.1 | 0.92 | 0.92 | 1.1 | 1.1 | 0.92 | 0.92 |
| Initial- | 65 | 70 | 70 | 75 | 65 | 70 | 70 | 75 |

TABLE 1-continued

| Ingredients | Compositions of This Invention | | | | Compositions for Comparison | | | |
|---|---|---|---|---|---|---|---|---|
| | No. 1 | No. 2 | No. 3 | No. 4 | No. 5 | No. 6 | No. 7 | No. 8 |
| Penetration Penetration after 300 hours' storage at 200° C. | 60 | 65 | 64 | 69 | 30 | 35 | 35 | 40 |
| Changing Rate of Penetration (%) | −8 | −7 | −9 | −8 | −54 | −50 | −50 | −47 |

*Antioxidant:

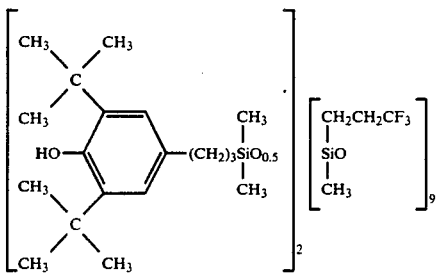

As can be clearly seen from the data in Table 1, the compositions of this invention which contained Polysiloxane V having arylamino groups showed remarkably improved heat resistance.

EXAMPLE 2

To 100 parts by weight of Polysiloxane VI having an average formula,

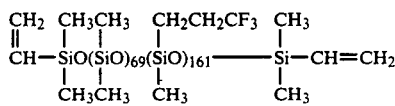

and a viscosity of 5,000 cp at 25° C. was added 30 parts by weight of dry fine-powdered silica which had been subjected to a surface treatment with hexamethyldisilazane, and had a specific surface area of 180 m²/g. A homogeneous mixture was prepared by kneading them with a kneading machine. This mixture were admixed with 0.5 part by weight of tetramethyltetra-vinylcyclotetrasiloxan e as a reaction controlling agent, 0.1 part by weight of 2-ethylhexanol modified chloroplatinic acid catalyst having a platinum content of 2 wt % (Platinum-I), 3 parts by weight of hydrogenpolysiloxane (Polysiloxane VII) having an average formula,

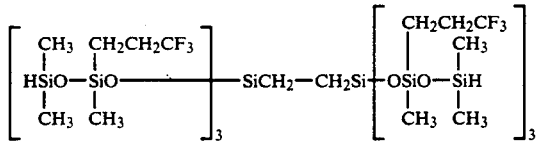

and a viscosity of 20 cp at 25° C., and 1 part by weight of Polysiloxane V used in Example 1 to prepare the composition No. 9.

For comparison, the composition No. 10 was prepared in the same manner as the composition No. 9, except Polysiloxane V was not added.

These compositions each was set in an injection molding machine (made by Yamashiro Seiki K. K.), made into a sheet of 150 mm×150 mm×2 mm by adopting an injection pressure of 90 kg/m², an injection time of 5 sec., and a molding condition of 40 seconds at 150° C., and then subjected to postcuring for 1 hour at 150° C. Physical properties of the thus formed sheets each were determined in accordance with the method based on JIS-K-6301.

The thus cured sheets were examined for heat resistance by placing them in a 220° C. oven of circulated air heating type oven for 100 hours, and then determining changes in physical properties.

The results obtained are shown in Table 2.

TABLE 2

| | Compsn. No. 9 (This Invention) | Compsn. No. 10 (Comparison) |
|---|---|---|
| Hardness (JISA) | 40 | 41 |
| Tensile strength (kgf/cm²) | 60 | 60 |
| Elongation (%) | 360 | 350 |
| Tear strength (JISA kgf/cm) | 15 | 16 |
| After 100-hour lapse at 220° C. | | |
| Hardness | 47 | 59 |
| Tensile strength (kgf/cm²) | 57 | 36 |
| Elongation (%) | 300 | 150 |
| Change in weight | −3% | −12% |

The data in Table 2, in analogy with those in Table 1, substantiates the excellence of the composition of the present invention with respect to heat resistance.

What is claimed is:

1. A curable fluorosilicone composition which contains:

(1) 100 parts by weight of an organopolysiloxane having an average compositional formula of $(CF_3CH_2CH_2)_a R^1_b SiO_{(4-a-b)/2}$, wherein $R^1$ represents a monovalent hydrocarbon residue of 1 to 8 carbon atoms, and at least 0.005 mol % of $R^1$ is a vinyl and/or allyl group; and "a" represents a figure from 0.1 to 1.0 and "b" represents a figure from 2.5 to 1.0, provided that a+b ranges from 1.8 to 3.0.

(2) an organohydrogensiloxane having an average of at least two hydrogen atoms bonded to silicon atoms in the molecule in such an amount as to provide a ratio of from 0.5 to 3 silicon-bonding hydrogen to the unsaturated groups bonded to the silicon atoms contained in the organosiloxane (1), (3) 0.01 to 10 parts by weight of at least one organopolysiloxane represented by one of the following general formulae:

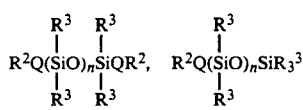

and

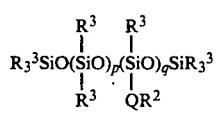

wherein $R^2$ represents a monovalent aromatic amino group; $R^3$ represents a substituted or unsubstituted monovalent hydrocarbon residue of 1 to 8 carbon atoms which does not contain any aliphatic unsaturated moiety; Q represents —O—, or a divalent hydrocarbon residue of 1 to 6 carbon atoms; n represents an integer from 0 to 500; and p represents an integer from 0 to 47 and q represents an integer from 1 to 10, provided that p+q ranges from 1 to 48, and (4) a catalytic amount of a catalyst selected from platinum, palladium or rhodium compounds.

2. The curable fluorosilicone composition of claim 1, wherein $R^2$ of the third component is

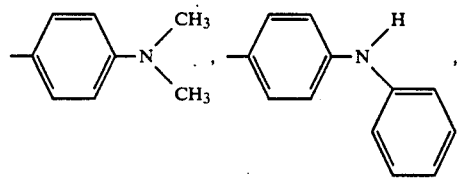

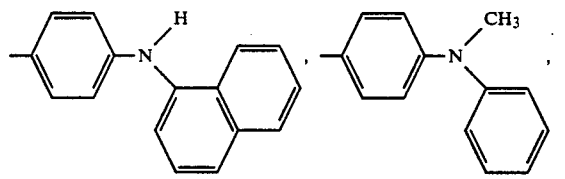

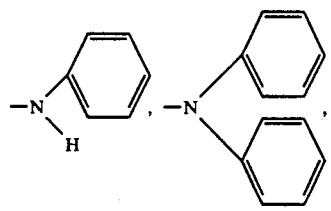

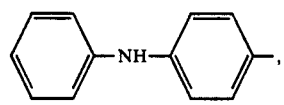

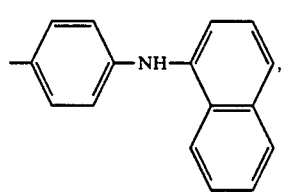

-continued

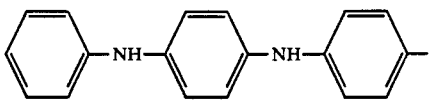

or

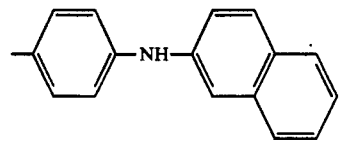

3. The curable fluorosilicone composition of claim 1, wherein Q of the third component is —O—, —CH$_2$CH$_2$— or —CH$_2$CH$_2$CH$_2$—.

4. The curable fluorosilicone composition of claim 1, wherein the organopolysiloxane of the first component is linear diorganopolysiloxane.

5. The curable fluorosilicone composition of claim 1, wherein the organopolysiloxane of the first component is a compound of the formula

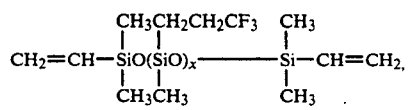

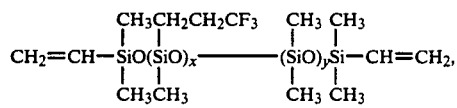

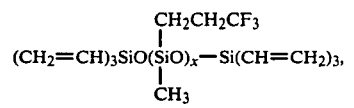

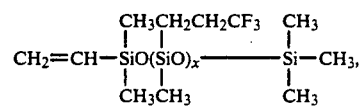

or

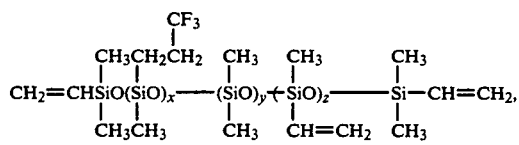

wherein in the above formulae, x, y and z are each a positive integer; x is from 1 to 1,000, the sum of x+y is from 2 to 1,000 and x+y+z is from 3 to 1,000.

6. The curable fluorosilicone composition of claim 1, wherein the organopolysiloxane of the second component is a compound of the formula

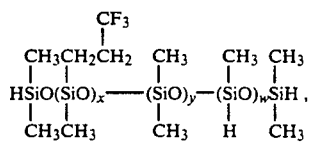

-continued
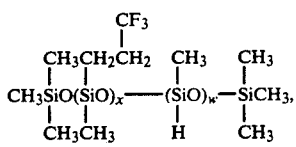
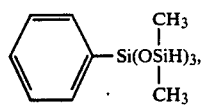
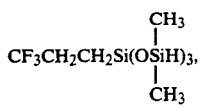
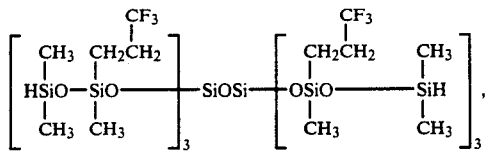
-continued
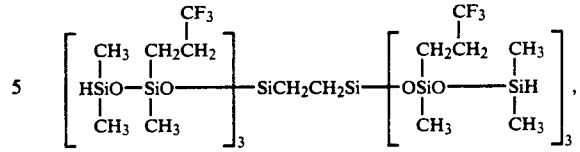
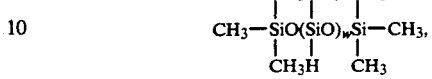
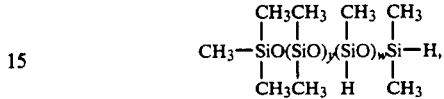
or
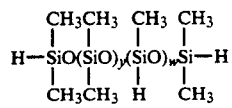
wherein in the above formulae, w, x and y are each a positive integer; w is from 2 to 500, w+y is from 3 to 500 and w+x+y is from 4 to 500.
7. A cured fluorosilicone composition produced by curing a curable fluorosilicone composition of claim 1.
* * * * *